UNITED STATES PATENT OFFICE.

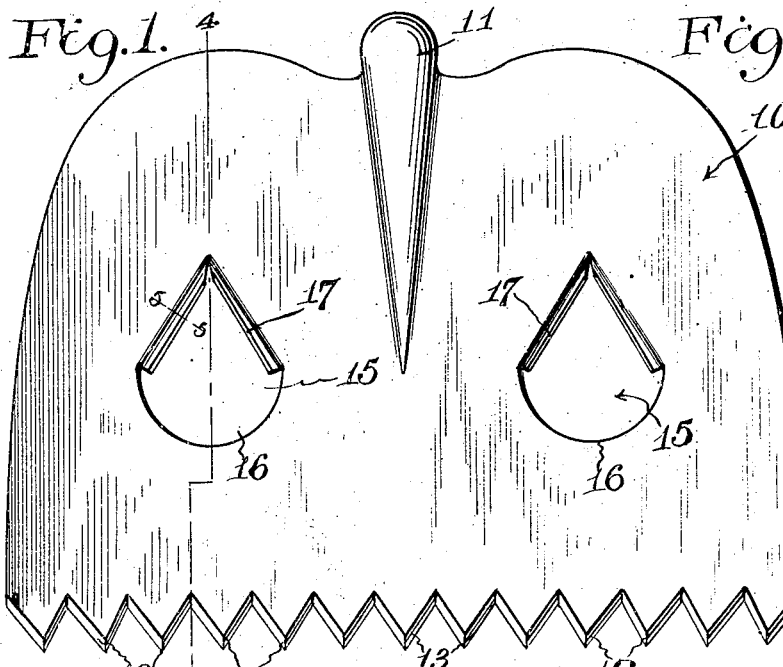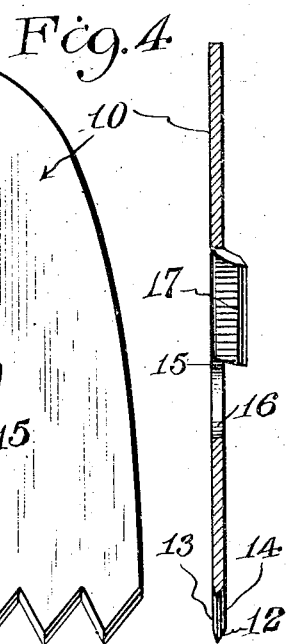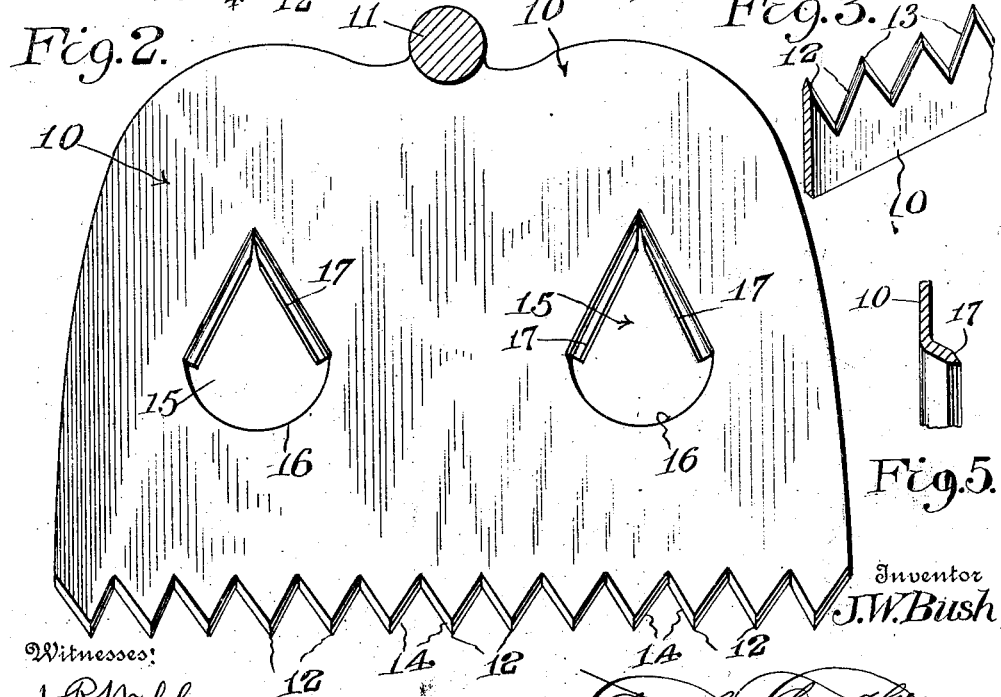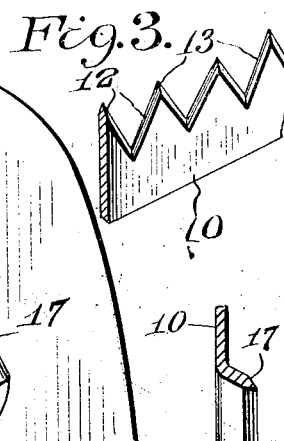

JUSTUS W. BUSH, OF INDIAN WELLS, ARIZONA.

HOE.

1,037,590.   Specification of Letters Patent.   Patented Sept. 3, 1912.

Application filed April 27, 1912. Serial No. 693,646.

*To all whom it may concern:*

Be it known that I, JUSTUS W. BUSH, a citizen of the United States, residing at Indian Wells, in the county of Navajo, State of Arizona, have invented certain new and useful Improvements in Hoes; and I do hereby declare the following to be a full, clear, and exact description of the invention, such as will enable others skilled in the art to which it appertains to make and use the same.

This invention relates to improvements in hoes, and particularly to the pulverizing hoes.

The principal object of the invention is to provide a simple device of this character by means of which the pulverizing capacity of the hoe is greatly increased.

Other objects and advantages will be apparent from the following description and with particular reference to the accompanying drawings.

In the drawings: Figure 1 is a front elevation of a hoe made in accordance with my invention, Fig. 2 is a rear elevation of the same, Fig. 3 is a view of the cutting edge of the hoe, Fig. 4 is a vertical section on the line 4—4 of Fig. 1. Fig. 5 is a fragmentary sectional view on the line 5—5 of Fig. 1.

Referring particularly to the drawings, 10 represents the blade of a hoe formed in accordance with my invention, and which is provided with the usual handle 11, said blade being in general outline similar to an ordinary hoe. The lower edge of this hoe blade is provided with a series of isosceles triangular teeth 12 both edges of which are beveled on both sides as indicated at 13 and
14. The double bevel of these teeth increase the cutting capacity of the teeth, and make them practically self-sharpening.

At suitable points through the blade above the teeth are formed the openings 15, through which the soil is adapted to pass in the operation of the hoe, each of said openings having the lower semi-circular portion, 16, and the upper triangular portion 17, the side walls of said upper portion being beveled on the face of the hoe away from the operator. These beveled edges are bent slightly rearward and serve to further pulverize the soil as it passes through the said opening.

A hoe formed in the manner above described is simple, cheap and light, and has a greatly increased pulverizing capacity owing to the double bevel of the cutting edge of the hoe, together with the beveled edges of the triangular portion of the opening in the body of the blade, which also permits the soil to pass therethrough.

What is claimed is:

1. A hoe blade having a serrated ground engaging edge, each tooth of which is beveled on both edges and on both sides of the hoe blade, the said blade having openings above the serrated edge, the upper walls of each of said openings being beveled and bent rearwardly from the face of the blade.

2. A hoe blade having a double beveled serrated ground engaging edge, and openings above the serrated edge, each of said openings having the upwardly converging walls and the lower semi-circular wall, the said converging walls being beveled and bent outwardly from the rear face of the hoe blade.

In testimony whereof, I affix my signature, in presence of two witnesses.

JUSTUS W. BUSH.

Witnesses:
  LEWIS C. JOHNSTON,
  EDWIN J. MARTY.